United States Patent
Ahn et al.

(10) Patent No.: US 6,923,629 B2
(45) Date of Patent: Aug. 2, 2005

(54) VENTING APPARATUS FOR A TIRE VULCANIZING MOLD

(75) Inventors: Myeong Hun Ahn, Daejeon (KR); In Seog Jang, Daejeon (KR); Yong Sub Kim, Daejeon (KR)

(73) Assignee: Hankook Tire Co., Ltd. (KR)

( * ) Notice: Subject to any disclaimer, the term of this patent is extended or adjusted under 35 U.S.C. 154(b) by 226 days.

(21) Appl. No.: 10/374,862

(22) Filed: Feb. 26, 2003

(65) Prior Publication Data

US 2004/0005371 A1 Jan. 8, 2004

(30) Foreign Application Priority Data

Jul. 4, 2002 (KR) ............................... 10-2002-0038710
Dec. 2, 2002 (KR) ............................... 10-2002-0076003

(51) Int. Cl.[7] .............................................. B29C 35/02
(52) U.S. Cl. ................................. 425/28.1; 425/812
(58) Field of Search ............................ 425/28.1, 812; 249/141

(56) References Cited

U.S. PATENT DOCUMENTS 3,885,618 A * 5/1975 Hodler ....................... 425/812
4,492,554 A * 1/1985 Carter ........................ 425/812
5,939,101 A * 8/1999 Green ........................ 425/28.1
5,997,783 A * 12/1999 Hunter et al. ............... 425/812
6,036,899 A * 3/2000 Iwai et al. ................... 425/812

FOREIGN PATENT DOCUMENTS

DE         195 43 276      *  2/1997
GB         2339163         *  1/2000

* cited by examiner

Primary Examiner—James P. Mackey
(74) Attorney, Agent, or Firm—Cantor Colburn LLP

(57) ABSTRACT

The present invention relates to an improved venting apparatus installed in a tire vulcanizing mold. In the venting apparatus, an inner diameter of a center through hole formed in the casing is gradually increased in an upper direction and is gradually decreased in a lower direction for thereby forming a tapered shape. The angles of the slant surfaces of the valve head point-contacting with an upper corner portion of the center through hole are different, so that a discharging capability of air is enhanced, and it is possible to prevent a formation of a vent rubber in a finished tire which vent rubber is formed when a rubber flows into a venting apparatus. In addition, it is possible to prevent an error operation during vulcanization and to extend a life span of a venting apparatus. The maintenance is easier.

9 Claims, 5 Drawing Sheets

VENTING APPARATUS FOR A TIRE VULCANIZING MOLD

BACKGROUND OF THE INVENTION

1. Field of the Invention

The present invention relates to a venting apparatus for a tire vulcanizing mold, and in particular to a venting apparatus for a tire vulcanizing mold which is capable of enhancing a discharging capacity of air by improving a venting apparatus installed in a vulcanizing mold, preventing a vent rubber formed when a rubber flows into a venting apparatus from being formed in a finished tire, preventing an error operation during a vulcanization, extending a life span of a venting apparatus and implementing an easier maintenance.

2. Description of the Background Art

Generally, a green tire which is a fabricated in a raw rubber state is a tire vulcanized in a vulcanization mold of a high temperature and pressure. A vulcanization mold is formed of a mold segment and a bladder which pressurizes a green tire in a mold. A vent hole is installed in an inner side surface of a mold for discharging air from a portion between a green tire and a mold to the outside.

The above vent hole is formed to discharge air as well as a rubber of a green tire based on a vulcanization pressure. Since the finally fabricated tire has a vent rubber on the surface of the same, a trimming process should be performed for removing a vent rubber.

In order to overcome the above problems, FIG. 1 is a view illustrating a venting apparatus (DE 195 43 276 C1) which is one of the conventional venting apparatuses.

As shown in FIG. 1, the venting apparatus includes a casing 14 inserted in a vent hole 12 of a mold 10, a valve body 18 inserted in a center through hole 16 of the casing 14, a spring (pressure or return spring) 20 elastically installed in the valve body 18, and a stopper 22 which is engaged to a lower end portion of the valve body 18 and controls a moving distance in a vertical direction of the valve body 18.

In addition, the valve body 18 includes a valve insert 24 which is provided in the center through hole 16 of the casing 14 and is surrounded by the spring 20, and a valve head 28 which contacts with a slant surface formed in an upper portion of the center through hole 16. Here, the side surface of the valve head 28 has a slant surface 30 having the same slant angle as the slant angle of the slant surface 26 formed in the upper portion of the center through hole 16. Two slant surfaces 26 and 30 surface-contact each other, and the alternate interior angles of two slant surfaces are same.

In the above venting apparatus, since the slant angles of the slant surface 30 of the valve head 26 and the slant angle of the upper slant surface 26 of the center through hole 16 are same, when a rubber flowing through a portion between the slant surfaces 26 and 30 blocks the gaps for a short time, an air discharging capacity of the venting apparatus is decreased. In other words, even when a small gap is provided, the rubber of the green tire may penetrate into the gap by a high pressure during the vulcanization.

In addition, in the case that the rubber is held in one of the left and right slant surfaces 26 and 30, the valve head 28 may be eccentric, so that the vent rubber may be formed in the vulcanized tire.

The outer circumferential portion of the casing 14 is formed in a cylindrical shape and has the same diameter in its whole portions. The inner portion of the vent hole 12 of the mold 10 into which the casing 14 is inserted, is formed in a cylindrical shape. In the case that the inner diameter of the vent hole 12 is the same as the outer diameter of the casing 14, since the casing 14 is supported by only friction force with the inner circumferential portion of the vent hole 12, the casing 14 may be pushed into the interior of the vent hole 12 by a high pressure during the vulcanization.

In addition, since the diameters of the upper and lower portions of the center through hole 16 formed in the center of the casing 14 are same, and the diameters of the upper and lower portions of the valve insert 24 are same, the inner volume of the center through hole 16 is always same in its upper and lower portion. Therefore, the space between the inner surfaces of the valve insert 24 and the center through hole 16 are very small, and the space in their upper and lower portions are same, in the case that the rubber which flows into the interior of the center through hole 16 is held between the spring 20, an elastic moving capacity of the valve body 18 may be lost, so that the venting apparatus may no be operated.

SUMMARY OF THE INVENTION

Accordingly, it is an object of the present invention to provide a venting apparatus for a tire vulcanizing mold which is capable of minimizing a length of a way of air which flows through a venting apparatus assuming that an introduction of rubber into a center through hole of a casing is not fully prevented, preventing a rubber from remaining in the interior of an air way, enhancing a vent performance when a space of a center through hole is largely formed and extending a life span of a venting apparatus.

It is another object of the present invention to provide a venting apparatus for a tire vulcanizing mold which is capable of minimizing a length of a way of air which passes through a venting apparatus, preventing a rubber from being held in a way of air, enhancing a venting performance by maximizing a space of a center through hole and extending a life span of a venting apparatus.

It is further another object of the present invention to provide a venting apparatus for a tire vulcanizing mold which is capable of overcoming the problems that a casing is pushed into the interior of the vent hole by a high pressure during a vulcanization by improving the constructions of a vent hole and casing in a mold.

In order to achieve the above objects, in a venting apparatus for a tire vulcanizing mold which includes a casing inserted in a vent hole of a mold, a valve body which is formed of a valve head inserted in a center through hole of the casing and a valve insert, a spring which surrounds the valve insert for thereby providing a certain elastic force to the valve body, and a stopper which is engaged to a lower end portion of the valve insert and actually controls the entire moving distance of a corresponding valve body in a vertical direction, there is provided a venting apparatus for a tire vulcanizing mold in which an inner diameter of a center through hole in the casing is gradually increased in an upper direction and is gradually decreased in a lower direction for thereby forming a tapered shape, and a slant angle of a slant surface of the valve head point-contacting with an upper corner portion of the center through hole is different from a slant angle of a corner portion of the center through hole.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 1:
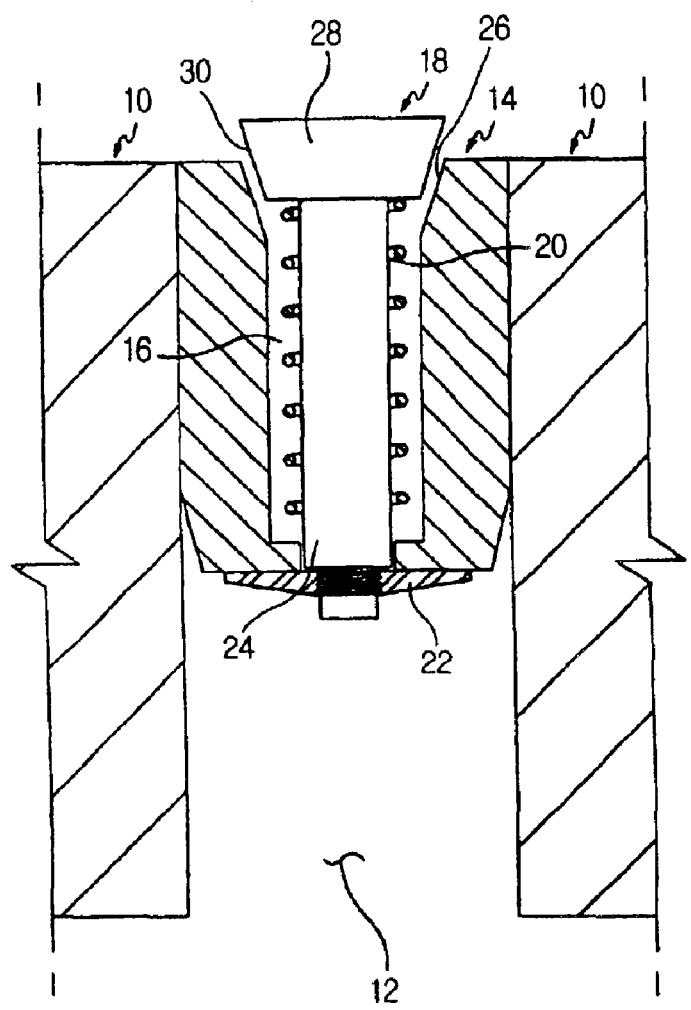
FIG. 1 is a vertical cross-sectional view illustrating the entire construction in a state that a conventional venting apparatus is engaged to a mold.
Figure 2:
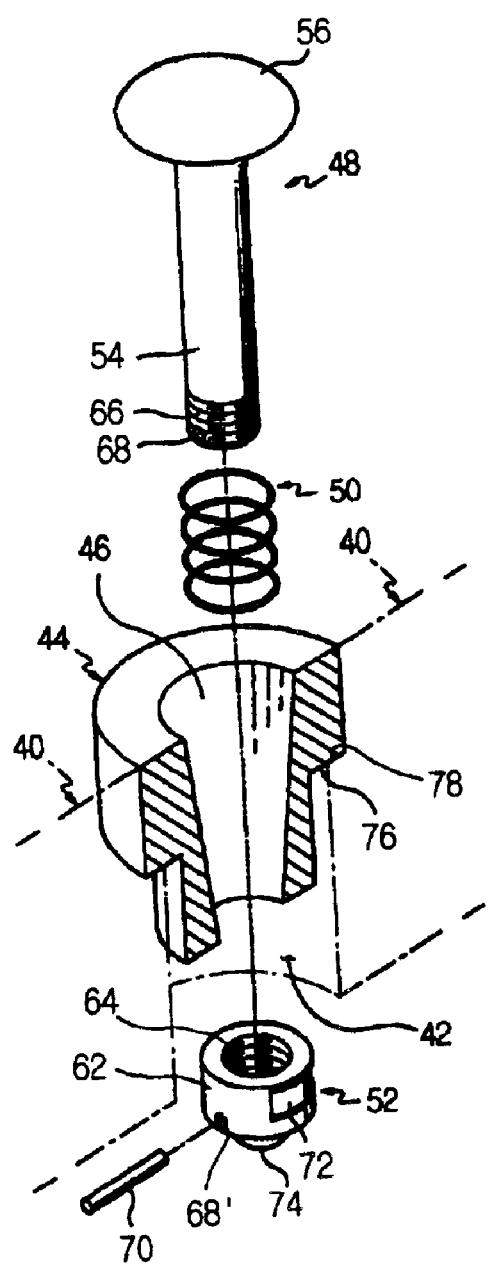
FIG. 2 is a disassembled perspective view illustrating a venting apparatus according to a first embodiment of the present invention.
Figure 3:
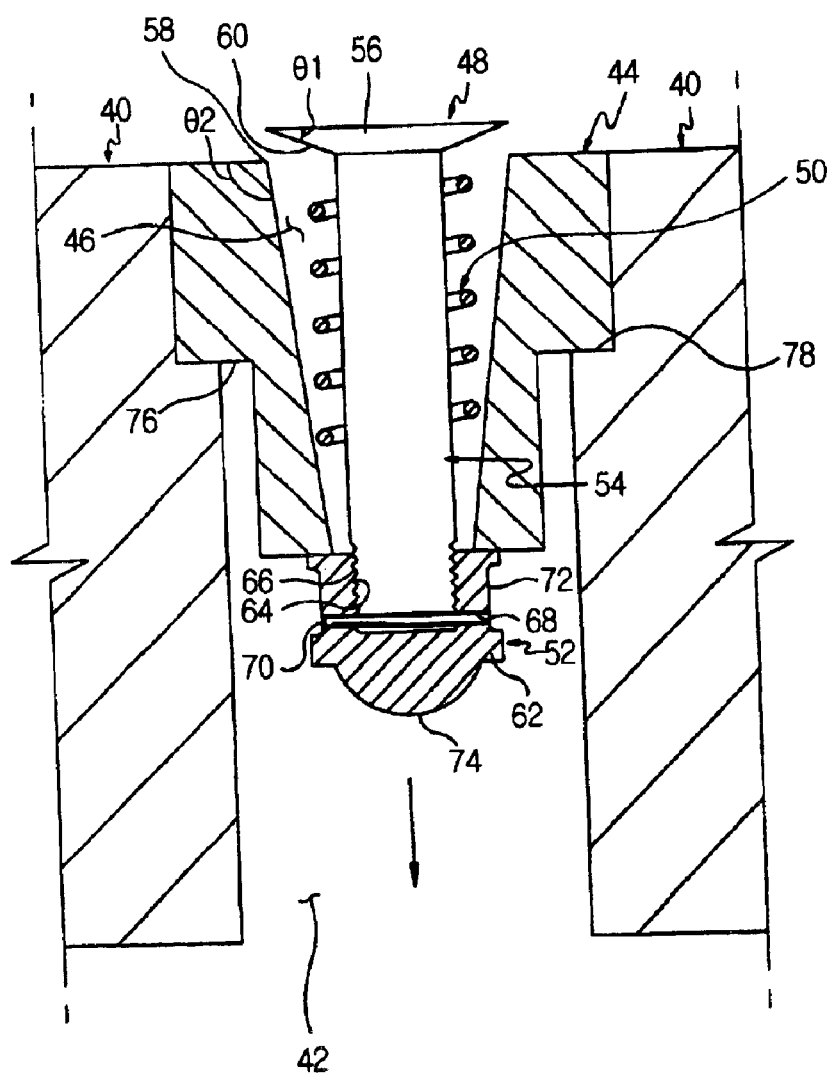
FIG. 3 is a vertical cross-sectional view illustrating the entire construction in a state that a venting apparatus of FIG. 2 is engaged to a mold.

FIG. 2 is a disassembled perspective view illustrating a venting apparatus according to a first embodiment of the present invention, and FIG. 3 is a vertical cross-sectional view illustrating the entire construction in a state that a venting apparatus of FIG. 2 is engaged to a mold.

As shown in FIGS. 2 and 3, the venting apparatus according to a first embodiment of the present invention includes a casing 44 inserted in a vent hole 42 of a mold 40, a valve body 48 inserted tin a center through hole 46 of the casing 44, a spring 50 which surrounds a lower portion of the same for providing an elastic force to the valve body 48, and a stopper 52 which is engaged to a lower end portion of the valve body 48 and controls a moving vertical distance of the valve body 48.

The inner diameter of the center through hole 46 formed in the casing 44 is gradually increased in the upper direction and is gradually decreased in the lower direction for thereby forming a taper shape. The valve body 48 is provided in the center through hole 46 of the casing 44 and is surrounded by the spring 50 for thereby providing a certain elastic force and includes a cylindrical valve insert 54 which has the same diameter, and a conical valve head 56 which is provided on an upper portion of the center through hole 46 and has a slant side surface formed in the top of the valve insert 54.

In the first embodiment of the present invention, an acute angle θ1 is preferably formed between the slant surface 60 and the upper surface of the valve head 56 contacting with an upper corner portion 58 of the center through hole 46, and an obtuse angle θ2 is preferably formed in the upper corner portion 58 of the center through hole 46 for the reason that in the case that the valve head 56 is lowered in the arrow direction of FIG. 3 due to an expansion of the green tire, the slant surface 60 of the valve head 56 is point-contacted with the upper corner portion 58 of the center through hole 46, not surface-contact each other, so that the green tire is prevented from being flown into the interior of the center through hole 46.

Here, a slant angle θ1 of the slant surface 60 of the valve head 56 is preferably set between 3° and 30°, and a slant angle θ2 of the upper corner portion 58 in the center through hole 46 is preferably set between 93° and 130°.

In the first embodiment of the present invention, the diameter of the valve insert 54 which is inserted in the spring 50 in the center through hole 46 of the casing 44 is same in its entire portions and is formed in a cylindrical shape. The stopper 52 installed in a lower end portion of the valve insert 54 is formed of the nut 62. In particular, the nut 62 is preferably formed of a cap nut which has a closed one side. The length of the portion in which a thread 64 is formed in the nut is the same as the entire moving length of the valve body 48. It is possible to uniformly adjust the moving lengths of the multiple valve bodies 48 which are in the mold 40 based on only an operation that the nut 64 is fully tightened to a bolt portion 66 formed at an end portion of the valve insert 54.

Here, through penetrating holes 68 and 68' are formed in the center portion of the nut 62 and the front end portion of the bolt portion 66 engaged to the nut 62, respectively. When a fixing pin 70 is inserted through the penetrating holes 68 and 68' after the nut 62 is engaged to the bolt portion 66, the nut 62 is randomly rotated from the bolt portion 66 by the fixing pin 70 for thereby preventing a loosening of the same.

In addition, in the first embodiment of the present invention, as another member for preventing a loosening of the nut 62 as the nut 62 is randomly rotated from the valve insert 54, a certain member capable of pressurizing a pat of an outer surface of the nut 62 may be used after the nut 62 is engaged to the bolt portion 66. At this time, the pressurizing degree is inwardly protruded by about 0.1 through 0.4 mm compared to an outer diameter of the initial nut 62. Namely, as shown in FIGS. 2 and 3, a stopper pressurizing portion 72 is formed in order for a pressurizing tool to be inserted into a part of the outer surface of the nut 62 for implementing an easier pressurizing operation of the nut 62.

In addition, an impact portion 74 is formed for applying a certain impact to a lower surface of the nut 62 for thereby minimizing a damage of the venting apparatus during a process that the venting apparatus is separated from the vent hole 42 for implementing an exchange and maintenance.

In the first embodiment of the present invention, an engaging shoulder 76 is outwardly protruded along an outer surface of the casing 44, and a mounting shoulder 78 is formed along an inner side surface of the vent hole 42 into which the casing 44 is inserted in order for the engaging shoulder 76 to be mounted. Therefore, it is possible to prevent the venting apparatus from being pushed into the interior of the vent hole 42 in the arrow direction by a high pressure during the tire vulcanization.

Figure 4:
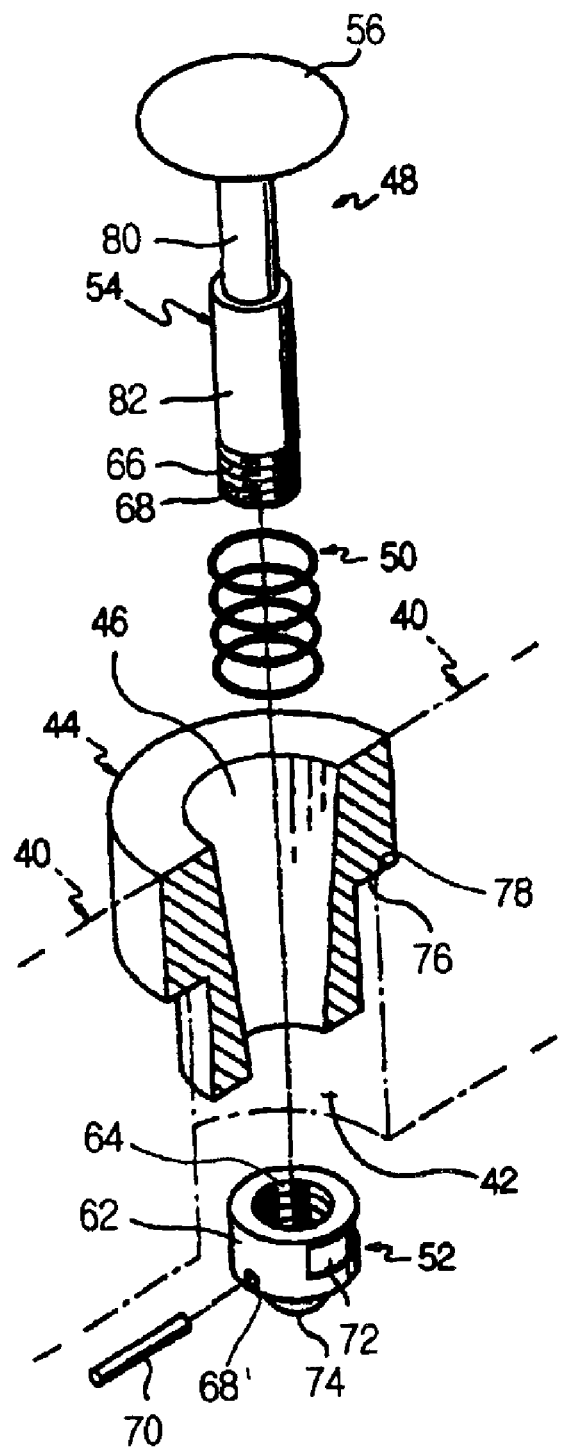
FIG. 4 is a disassembled perspective view illustrating a venting apparatus according to a second embodiment of the present invention.
Figure 5:
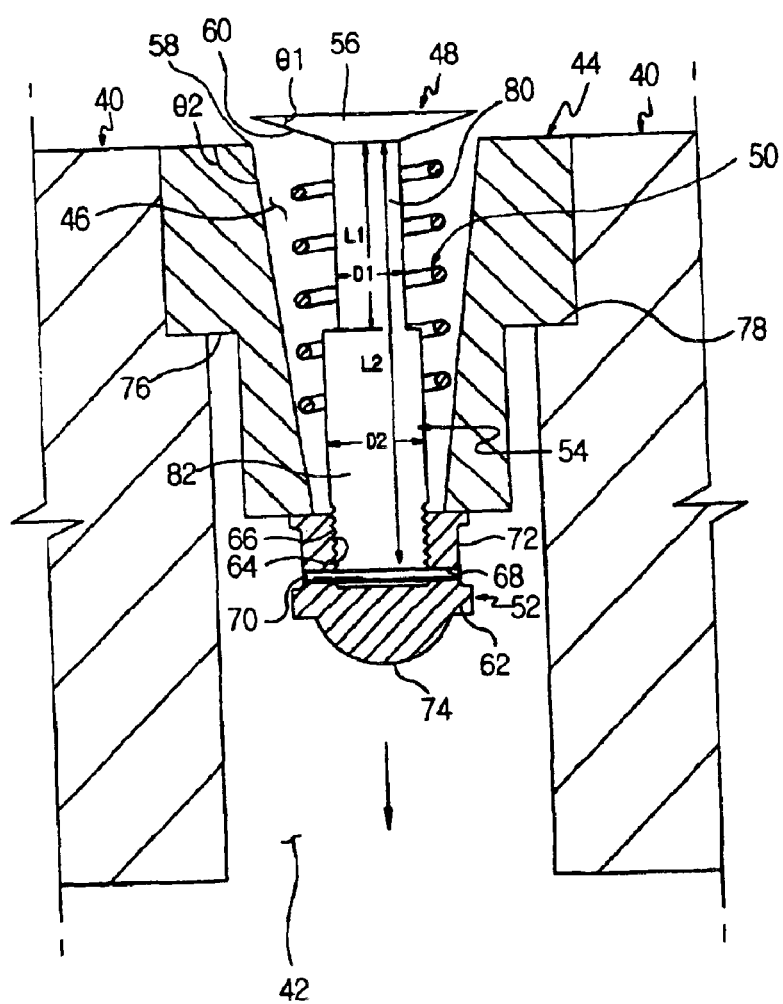
FIG. 5 is a vertical cross-sectional view illustrating the entire construction in a state that a venting apparatus of FIG. 4 is engaged to a mold.

FIG. 4 is a disassembled perspective view illustrating a venting apparatus according to a second embodiment of the present invention, and FIG. 5 is a vertical cross sectional view illustrating the entire construction in a state that a venting apparatus of FIG. 4 is engaged to a mold. The constructions of FIGS. 4 and 5 are similar to the constructions of FIGS. 2 and 3. Therefore, the same reference numerals are given to the same elements.

As shown in FIGS. 4 and 5, in the second embodiment of the present invention, the valve insert 54 which us surrounded by the spring 50 in the center through hole 46 of the casing 44 is formed in such a manner that the diameter of the upper portion 80 near the valve head 56 is narrower, and the diameter of the lower portion 82 far from the valve head 56 is wider. The diameter D1 of the upper portion 80 is in a range of 5 through 70% compared to the diameter D2 of the lower portion 82, so that it is possible to obtain a certain space into which the rubber flows in.

In addition, in connection with the length of the valve insert 54 the length L1 of the upper portion 80 is preferably less than half of the entire length L2.

In the thusly constituted venting apparatus according to the present invention, as the green tire inserted in the vulcanization mold 40 is expanded by a bladder, and the air between the green tire and the mold 40 is discharged to the outside of the mold 40 through a gap between the valve head 56 and the center through hole 46. In the case that the green tire is continuously expanded, the surface of the green tire contacts with the valve head 56, and the valve body 48 presses the spring 50 and is lowered in the arrow direction of FIGS. 3 and 5.

In the venting apparatus of the present invention, when the valve body 48 presses the spring 50 and is lowered, the center through hole 46 is disconnected at the time when the slant surface 60 of the valve head 56 contacts with the corner portion 58 of the upper end of the center through hole 46, so that the green tire does not flow into the interior of the center through hole 46.

Even hen the rubber of the green tire of a high vulcanization pressure is flown into the interior of the center through hole 46, the flown-in rubber is cut by the slant surface 60 of the valve head 56 based on a point contact at the upper corner portion 58 of the center through hole 46, so that it is possible to prevent a formation of the vent rubber in the finished tire after the vulcanization.

In the present invention, it is possible to enhance a discharging capacity of the air and to prevent a formation of the vent rubber in the finished tire. In addition, it is possible to prevent an error occurrence during the vulcanization and to extend a life span of the apparatus. An easier maintenance is implemented.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In a venting apparatus for a tire vulcanizing mold which includes a casing inserted in a vent hole of a mold, a valve body which is formed of a valve head inserted in a center through hole of the casing and a valve insert, a spring which surrounds the valve insert for thereby providing a certain elastic force to the valve body, and a stopper which is engaged to a lower end portion of the valve insert and actually controls the entire moving distance of corresponding said valve body in a vertical direction, the venting apparatus for said tire vulcanizing mold being characterized by:

an inner diameter of said center through hole in the casing is gradually increased in an upper direction and is gradually decreased in a lower direction for thereby forming a tapered shape, and a slant angle of a slant surface of the valve head point-contacting with an upper corner portion of the center through hole is different from a slant angle of the upper corner portion of the center through hole.

2. The apparatus of claim 1, wherein said slant angle of a said slant surface of the valve head is an acute angle, and said slant angle of said upper corner portion of the center through hole is an obtuse angle.

3. The apparatus of claim 2, wherein said slant angle of a said slant surface of the valve head is set in a range of 3° to 30°, and said slant angle of said upper corner portion of the center through hole is set in a range of 93° to 130°.

4. The apparatus of claim 1, wherein in said valve insert, a diameter of an upper portion near the valve head is smaller than the diameter of a lower portion which is far therefrom, and the length of the upper portion is less than half below of the entire length of the valve insert.

5. The apparatus of claim 1, wherein said casing includes an engaging shoulder along an outer surface of the same, and a mounting shoulder is formed along an inner surface of the vent hole into which the casing is inserted, in order for the engaging shoulder to be mounted.

6. The apparatus of claim 1, wherein said stopper installed in a said lower end portion of the valve insert is a nut which has a closed one side, and the length of a thread of the nut is the same as the moving distance of the valve body in a vertical direction.

7. The apparatus of claim 6, wherein penetrating holes are formed in a center portion of the nut and in an end portion of a bolt portion formed at an end portion of the valve insert, respectively, a fixing pin is inserted into the through hole penetrating holes, so that the nut is prevented from being loosened.

8. The apparatus of claim 6, wherein an impact portion is formed on a lower surface of the nut for minimizing a damage of the venting apparatus when separating the venting apparatus from the vent hole.

9. The apparatus of claim 6, wherein a stopper pressurizing portion is formed in a part of an outer surface of the nut so that the nut which is inwardly protruded by 0.1 through 0.4 mm with respect to a minimum outer diameter of the nut in order for a pressurizing tool to be inserted, is not loosened from said valve insert.

* * * * *